May 30, 1939.　　　U. FABBRO　　　2,160,696
MACHINE FOR SHAPING BUTTER AND LIKE MATERIALS
Filed Aug. 5, 1937　　　2 Sheets-Sheet 1

INVENTOR
Umberto Fabbro
by Young, Emery & Thompson
ATTYS.

May 30, 1939.   U. FABBRO   2,160,696
MACHINE FOR SHAPING BUTTER AND LIKE MATERIALS
Filed Aug. 5, 1937   2 Sheets-Sheet 2

INVENTOR
Umberto Fabbro
by Young, Emery & Thompson
ATTYS.

Patented May 30, 1939

2,160,696

UNITED STATES PATENT OFFICE 2,160,696

MACHINE FOR SHAPING BUTTER AND LIKE MATERIALS

Umberto Fabbro, Melbourne, Victoria, Australia

Application August 5, 1937, Serial No. 157,611
In Australia January 16, 1937

15 Claims. (Cl. 31—14)

This invention relates to an improved machine for extruding butter and such like materials from a block or mass of the material into relatively small portions of pre-determined shape for table and like use.

The object of the invention is to provide a simple compact and efficient machine whereby the shaped pieces of butter or like material may be rapidly produced, the machine being especially suitable for hotels, cafes and the like where relatively large quantities of butter and similar comestibles are consumed.

But in order that this invention may be better understood, reference will now be made to the accompanying sheets of drawings, which are to be taken as part of this specification and read herewith:—

Figure 1:
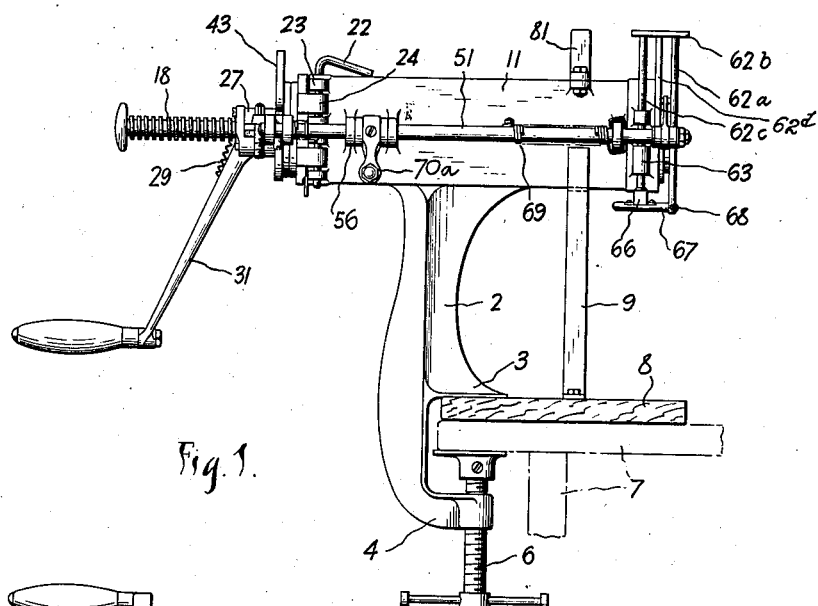
Figure 1 is a side elevation of the improved machine.
Figure 2:
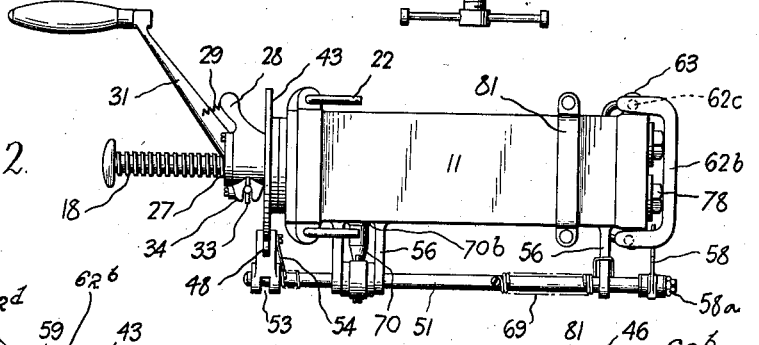
Figure 2 is a plan thereof.

In the drawings, the numeral 2 indicates a supporting bracket which may be provided with a pair of jaws indicated at 3 and 4, and a clamping screw 6 passing through the lower jaw, whereby the machine may be clamped to a table or the like indicated at 7. A clamping board 8 is preferably interposed between the upper jaw 3 and the top of the table 7, which is thus protected, and another supporting bracket 9 may be secured to the board 8 and adapted at its upper end to form a rest or support for a casing 11, which is carried by the main supporting bracket 2.

The interior of the casing 11, which is preferably of elongated rectangular shape, forms a compression chamber 12 to accommodate the butter or the like being shaped.

Figure 5:
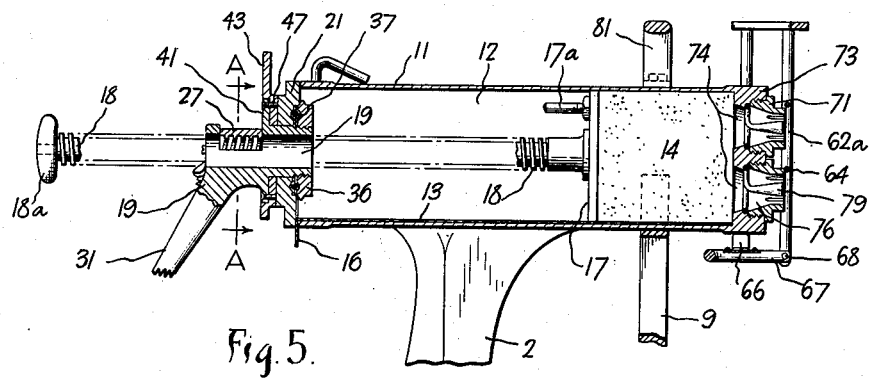
Figure 5 is a longitudinal section of the machine on a larger scale, parts being broken away for convenience of illustration.
Figure 8:
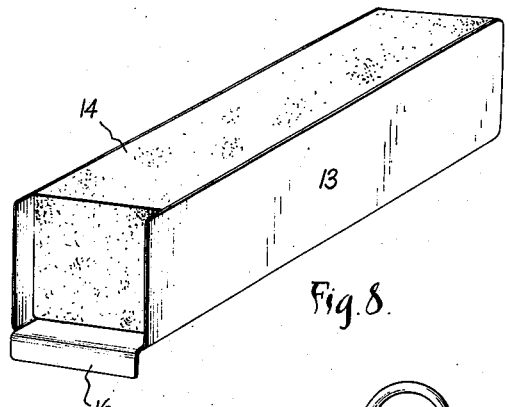
Figure 8 is an enlarged perspective view of a removable trough or holder containing a block of butter for insertion into the casing or compression chamber of the machine.
Figure 9:
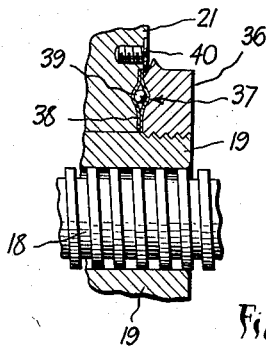
Figure 9 is an enlarged detail view showing portion of the aforesaid thrust bearing for the screw threaded plunger rod.

The chamber 12 is adapted to contain an elongated channel shaped trough or holder 13 (Figures 5 and 8), adapted to hold an elongated block 14 of butter or the like, which may be conveniently cut from a larger rectangular block such as is usually supplied to hotels, shops, cafes and the like, in bulk containers or butter boxes. The trough 13, which is open at each end, is adapted to slide into and out of the compression chamber 12 and for this purpose it is provided at one end with a downturned lip or fingerpiece 16, which is adapted to project from the rear or inlet end of the casing 11 as seen in Figure 5.

The trough 13 is also adapted to slidably accommodate a plunger 17 on a screw threaded plunger rod 18, which passes through a rotary guide sleeve 19. This sleeve passes through and is rotatably mounted within a removable door 21, which is adapted to fit over the rear or inlet end of the casing 11. The door 21 may be detachably secured to the end of the casing by means of removable pins 22 passing downwardly through lugs 23 on the casing 11 and corresponding lugs 24 on the door 21.

Connected by a hinge pin 26 (Figures 4 and 7), to the guide sleeve 19, is a hinged segmental nut 27, which is adapted to detachably engage the screw threaded plunger rod 18 when the machine is operating to extrude the butter or the like, as hereinafter described. The segmental nut 27 is provided with a lug 28 connected by a spring 29 to a cranked operating handle 31 which is formed integral with or secured to the sleeve 19. By means of this spring the nut 27 is normally disengaged from the screwed plunger rod 18 as seen in Figure 7.

Figure 6:
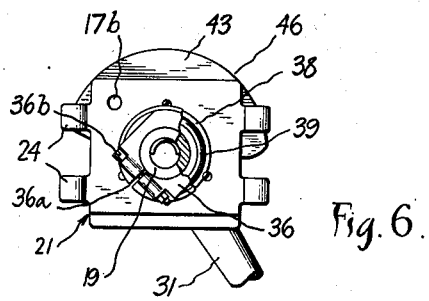
Figure 6 is a view looking at the inside face of the removable door which closes the left-hand or rear end of the casing seen in Figure 5, portions being broken away to show a thrust bearing in said door.

Connected by a pivot pin 32 to the sleeve 19 is a hinged clamping bolt 33, which is adapted to engage between lugs 34 on the nut 27, whereby the latter may be clamped to the screwed plunger rod 18 and the latter thus moved forwardly by turning the handle 31. Screwed on to the front end of the rotary guide sleeve 19 is a locking ring or collar 36, behind which is a thrust bearing 37 mounted in a recess 38 in the removable door 21. The collar or locking ring 36 is split as indicated at 36a in Figure 6 and is clamped to the sleeve 19 by a clamping screw 36b.

The thrust bearing 37 may consist of a pair of rings 38 surrounding the sleeve 19 and forming a ball race 39 which accommodates bearing balls adapted to take the back thrust of the plunger 17 as the latter is forced forwardly against the block of butter or the like 14 in the compression chamber 12. By this means, the effort necessary to operate the plunger in its forward stroke to extrude the butter or the like through the shaping nozzles, hereinafter described, is reduced to a minimum. The rings 38 forming the ball race may be retained within a recess in the door 21 by means of screws 40

Figure 4:
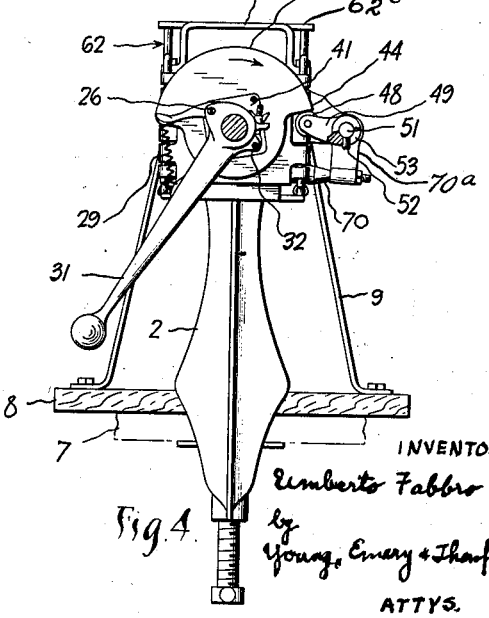
Figure 4 is a view looking at the opposite or rear end of the machine.
Figure 7:
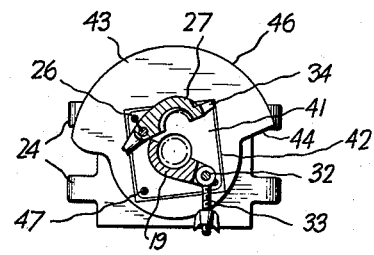
Figure 7 is a cross-sectional end elevation on the line A—A of Figure 5, the aforesaid door being removed from the casing and showing a hinged segmental nut on the operation handle raised so that it is disengaged from a screw threaded plunger rod hereinafter described.

Formed upon the sleeve 19 externally of the door 21 is a flange 41 which may be of rectangular form as shown in Figures 4 and 7 and is accommodated by a corresponding rectangular recess 42 in a cam plate 43. This cam plate is provided with cam faces 44, 46 and may be secured to the flange 41 by means of screws 47.

The cam faces 44, 46 are adapted to engage a roller 48 on an arm 49 pivoted on a rocking shaft 51 carrying an outstanding pin 52 which is accommodated by a slot 53 in the arm 49. A spring 54 engaging the arm 49 normally forces one end of the slot 53 against the pin 52 so that when the cam plate 43 is turned in the direction of the arrow in Figure 4, the cam face 44 will strike the roller 48 and force the arm 49 which is held down whilst the curved cam face 46 remains in engagement with the roller 48. This causes the shaft 51 to be turned to depress the reciprocating cutter frame hereinafter described.

In the event of the cam plate being turned in the wrong direction or oppositely to the arrow in Figure 4, the spring 54 permits the arm 49 to swing back out of the way of the cam.

The rocking shaft 51 is mounted in bearings 56 projecting from the side of the casing 11 and carries at its forward end a cutter operating arm 58 in which are slots 59 to accommodate studs or pins 61 carried by a reciprocating cutter frame 62. The cutter frame comprises two vertical rods 62a united at their upper ends by a cross-member 62b. The cutter frame also includes vertical guide rods 62c connected at their upper ends to said cross-member 62b. These guide rods slide vertically within guideways 63 on the sides of the casing 11. Studs or pins 61 are carried by a rod 62d depending from the cross-member 62b on one side of the cutter frame 62.

Extending transversely between the front vertical rods 62a of the cutter frame 62 are cutting members or wires 64 which reciprocate vertically against the front faces of shaping nozzles hereinafter described.

The lower ends of the guide rods 62c on the cutter frame are detachably engaged by spring clips 66 on a yoke 67 which is hinged at 68 to the lower ends of the rods 62a, so that by swinging the yoke 67 downwardly and thus disengaging the clips 66 from the lower ends of the guide rods 62c, the latter may be withdrawn upwardly through the guideways 63 and the cutter frame may thus be readily removed from the casing 11 for cleansing or other purposes.

Figure 3:
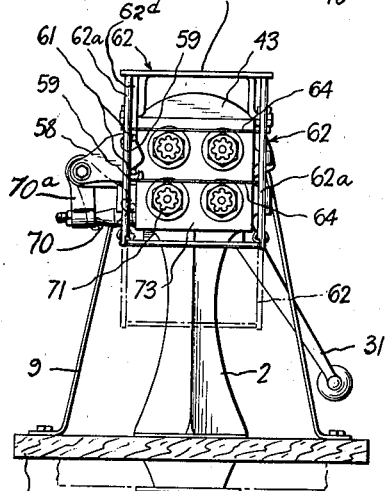
Figure 3 is a view looking at the right-hand or front end of the machine seen in Figures 1 and 2.

Connected to the shaft 51 is a spring 69 which also engages one of the bearings 56 and is adapted to act upon the rocking shaft 51 so as to normally force the cutter operating arm 58 and consequently the cutter frame 62 upwardly into the position shown in full lines in Figure 3. The cutter frame and its operating arm 58 are forced downwardly into the position shown in broken lines in Figure 3 by the action of the cam plate 43 engaging the roller 48 on the arm 49 and thus depressing the latter and turning the rocking shaft 51 as aforesaid, against the action of the spring 69.

By means of an adjustable stop 70 carried by an arm 70a on the rocking shaft 51, and adapted to normally engage at its inner end against the casing 11, the upward movement of the cutter frame 62 may be limited and its stroke thus regulated, according to requirements. The inner end of the stop may be fitted with a rubber or like buffer 70b.

Angular adjustment of the cutter operating arm 58 on the shaft 51 may be effected by means of a nut 58a which enables wear between the slots 59 and pins 61 to be taken up.

Figure 10:
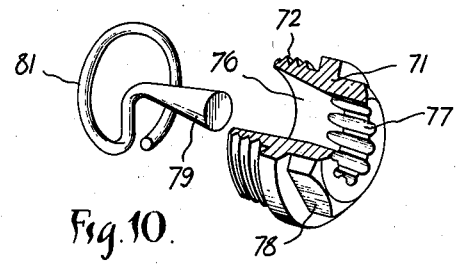
Figure 10 is an enlarged part-sectional perspective view showing one of the removable butter shaping nozzles through which the butter or the like is extruded from the compression chamber and an associated core piece by which the extruded pieces of butter or the like may be made hollow.

The shaping nozzles previously mentioned are indicated by the numeral 71 in Figures 3, 5 and 10. These nozzles, which may be of any suitable number, are provided with externally threaded portions 72 adapted to screw into corresponding holes in the front end wall 73 of the casing 11, the said end wall 73 being provided with apertures 74 which coincide with extrusion apertures 76 formed through the shaping nozzles 71. The walls of the apertures 74, 76 preferably converge forwardly as shown and the front portions of the apertures 76 in the nozzles 71 may be of fluted or other suitable form as indicated at 77 in Figure 10, whereby fancy shapes may be imparted to the exterior of the pieces of butter or the like, which are extruded through the nozzles.

The front portions of the nozzles 71 may be provided with nuts 78 to receive a spanner or the like for the purpose of tightening the nozzles within the apertures in the front wall 73 of the casing 11. The nozzles may be thus readily interchanged to produce butter pieces of different shapes and it will be evident that several different shapes may be produced simultaneously.

A core piece 79 may be arranged centrally within each of the shaping nozzles 71 so that the extruded pieces of butter or the like are of hollow form. The core piece 79 may be carried by a ring-like member 81 which is adapted to fit behind the respective nozzle 71 within the corresponding aperture in the front wall of the casing 11.

The outer end of the screwed plunger rod 18 is provided with a head or hand piece 18a, whereby it may be withdrawn as hereinafter described and the plunger 17 carries a positioning pin 17a which is adapted to enter a hole 17b in the removable door 21, so that when the plunger is withdrawn to a position adjacent the door 21, it is held square with the door for insertion into the casing 11.

In use, when it is desired to charge the compression chamber 12 with butter or the like, the door 21 is removed by withdrawal of the pins 22 from the coinciding lugs 23, 24 on the casing 11 and the door, so that the latter may be removed bodily with the plunger rod and the plunger when the latter has been drawn back against the locking ring or collar 36 on the removable door. The block of butter or the like 14 is now placed within the trough 13 which is slid into the chamber 12.

The door 21 with the plunger positioned squarely thereon by the pin 17a is then replaced and the door secured in position on the casing 11 by replacing the pins 22.

The hinged segmental nut 27 being held in engagement with the screwed rod 18 by means of the bolt 33, the crank handle 31 is now turned thereby forcing the plunger forwardly and thus extruding the butter or the like through the shaping nozzles 71. Simultaneously, the intermittent engagement of the cam plate 46 with the roller 48 causes the shaft 51 to oscillate so that the cutter operating arm 58 reciprocates the cutter frame 62, and the cutter wires 64 are reciprocated across the front faces of the nozzles 71, thus severing the pieces of butter or the like into short lengths which fall from the nozzles into a suitable receptacle.

During the forward movement of the plunger 17 against the block of butter or the like, the thrust on the plunger rod 18 is taken by the thrust bearing 37, thus reducing the necessary propulsive effort to a minimum.

When it is desired to withdraw the plunger, the operating handle 31 may be rotated in a reverse direction to withdraw the plunger rod by operation of the nut 27. During this operation the arm 49 carrying the roller 48 may be depressed to clear the cam plate 43. Owing to the arrangement of the slots 59 in the cutter operating arm 58 the cutter frame and the arm 49 carrying the roller 48 will remain in a depressed position if either the arm 49 or the cutter frame is depressed below the normal operating position. When the plunger has been thus withdrawn sufficiently to overcome the natural suction created within the compression chamber, the nut 27 may be disengaged from the plunger rod and the latter may be withdrawn by pulling on the hand grip 18a so that the plunger rod slides freely through the sleeve 19 and the plunger may be thus quickly withdrawn.

A hand grip 81 may be fitted to the casing 11 near the front end thereof, so that by pressing with one hand against this grip and pulling with the other hand on the head or hand piece 18a, the withdrawal of the plunger rod through the sleeve 19 is facilitated.

When the plunger is pulled back against the collar 36, the positioning pin 17a enters the hole 17b in the removable door 21 so that by removing the pins 22, the door and plunger may be bodily removed from the casing as aforesaid. By pulling on the downturned lip 16 of the trough 13, the latter may be withdrawn from the compression chamber 12 for the removal of any portion of the block of butter or the like 14 which may remain therein or for the reception of another block of the material as desired.

It will be evident that the various parts, including the door 21, the plunger and plunger rod, the nozzles 71 and the core pieces 79, may be readily removed from the casing 11. Likewise, by swinging the yoke 67 downwardly so as to disengage the catches 66 from the lower ends of the guide rods 62c, the reciprocating cutter frame may also be withdrawn from the guideways 63 for cleansing or other purposes.

Having now described my invention, what I claim as new and desire to secure by Letters Patent is:

1. An improved machine for shaping butter and like materials, consisting in the combination of a casing forming a compression chamber, a plunger adapted to operate within said chamber, a screw-threaded plunger rod attached to said plunger, a sleeve through which said plunger rod passes, shaping means adapted to shape the pieces of butter or like material as they are extruded from said chamber by said plunger, means associated with said plunger and adapted to sever said shaped pieces into predetermined lengths, a manually operated nut carried by said sleeve, and a cam carried by said sleeve adapted to transmit motion to said severing means.

2. An improved machine for shaping butter and like materials, consisting in the combination of a casing forming a compression chamber, a plunger adapted to operate within said chamber, a screw-threaded plunger rod attached to said plunger, a sleeve through which said plunger rod passes, shaping means adapted to shape the pieces of butter or like material as they are extruded from said chamber by said plunger, means associated with said plunger and adapted to sever said shaped pieces into predetermined lengths, a manually operated nut carried by said sleeve, a cam carried by said sleeve adapted to transmit motion to said severing means, said plunger and said casing being rectangular in cross-section, a removable door at the rear end of said casing, said door having a pin-receiving opening, and a positioning pin carried by the plunger and adapted to enter the opening in the door when the plunger is withdrawn to its rearmost position.

3. An improved machine for shaping butter and like materials, consisting in the combination of a casing forming a compression chamber, a plunger adapted to operate within said chamber, a screw-threaded plunger rod attached to the plunger, a rotary sleeve provided with a nut adapted to engage said screw-threaded plunger rod, a cam carried by said rotary sleeve, shaping means adapted to shape the pieces of butter or like material as they are extruded from said chamber by said plunger, means associated with said plunger and adapted to sever said shaped pieces into predetermined lengths, and transmission mechanism interposed between said cam and said severing means for operating said severing means synchronously with the plunger.

4. An improved machine for shaping butter and like materials, consisting in the combination of a casing forming a compression chamber, a plunger adapted to operate within said chamber, a screw-threaded plunger rod attached to said plunger, a rotary sleeve provided with a hinged segmental nut adapted to detachably engage said screw-threaded plunger rod, a cam carried by said rotary sleeve, shaping means adapted to shape the pieces of butter or like material as they are extruded from said chamber by said plunger, means associated with said plunger and adapted to sever said shaped pieces into predetermined lengths, a shaft extending from one end of said casing to the other, an arm carried by one end of said shaft, a roller on said arm adapted to engage said cam, and means on said shaft adjacent the other end thereof to impart a reciprocatory movement to said severing means, whereby the latter is operated synchronously with said plunger.

5. An improved machine for shaping butter and like materials, consisting in the combination of a casing forming a compression chamber, a plunger adapted to operate within said chamber, a screw-threaded plunger rod attached to said plunger, a rotary sleeve provided with a nut adapted to engage said plunger rod, a cam carried by said sleeve near the rear end of said casing, shaping means adapted to shape the pieces of butter or like material as they are extruded from said chamber by said plunger, means associated with said plunger and adapted to sever said shaped pieces into predetermined lengths, said severing means comprising a reciprocating cutter frame having cutting members thereon, a rocking shaft adapted to be actuated by said cam, a cutter operating arm carried by said shaft near the front end of said casing and adapted to actuate said cutter frame, whereby the cutting members thereon are reciprocated across said shaping means in a direction at right angles to the movement of said plunger and operated synchronously with the plunger.

6. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, means carried by said sleeve for detachably threadedly coupling said sleeve to the threads of the rod whereby rotation of the sleeve will impart axial movement to said rod, shaping means adapted to shape the pieces of butter or like material as they are extruded from said chamber by said plunger, and means associated with said plunger and adapted to sever said shaped pieces into predetermined lengths.

7. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, said sleeve having a cut-away portion exposing the threads of the rod, a threaded segment hinged to said sleeve and adapted to extend through said cut-away portion to engage the threads of the rod, shaping means adapted to shape the pieces of butter or like material as they are extruded from said chamber by said plunger, and means associated wtih said plunger and adapted to sever said shaped pieces into predetermined lengths.

8. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, a threaded segment hinged to said sleeve, means for detachably engaging said segment with the threads of said rod, shaping means adapted to shape the pieces of butter or like material as they are extruded from said chamber by said plunger, and means associated with said plunger and adapted to sever said shaped pieces into predetermined lengths.

9. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, a threaded segment hinged to said sleeve for detachably engaging the threads of said rod, and means for locking said segment in thread-engaging position.

10. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, a threaded segment hinged to said sleeve for detachably engaging the threads of said rod, means for locking said segment in thread-engaging position, and a spring urging said segment to a disengaged position.

11. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, means carried by said sleeve for detachably threadedly coupling said sleeve to the threads of the rod whereby rotation of the sleeve will impart axial movement to said rod, shaping means adapted to shape the pieces of butter or like material as they are extruded from said chamber by said plunger, means associated with said plunger and adapted to sever said shaped pieces into predetermined lengths, and a thrust bearing positioned between said sleeve and the associated end of the casing to take the rearward thrust of the plunger during the forward operative movement of the latter in the compression chamber.

12. An improved machine for shaping butter and like materials, consisting in the combination of a casing forming a compression chamber, a plunger adapted to operate within said chamber, a screw-threaded plunger rod attached to the plunger, a removable door, having an opening, for one end of the casing, said plunger rod extending through the opening in said door, a rotary sleeve extending through the opening of the door and surrounding said plunger rod, an operating handle directly carried by said sleeve, means carried by said sleeve for detachably threadedly coupling said sleeve to the threads of the rod whereby rotation of the sleeve will impart axial movement to said rod, shaping means adapted to shape the pieces of butter or like material as they are extruded from said chamber by said plunger, and means associated with said plunger and adapted to sever said shaped pieces into predetermined lengths.

13. An improved machine for shaping butter and like materials, consisting in the combination of a casing forming a compression chamber, a plunger adapted to operate within said chamber, a screw-threaded plunger rod attached to the plunger, a removable door, having an opening, for one end of the casing, said plunger rod extending through the opening in said door, a rotary sleeve extending through the opening of the door and surrounding said plunger rod, an operating handle directly carried by said sleeve, means carried by said sleeve for detachably threadedly coupling said sleeve to the threads of the rod whereby rotation of the sleeve will impart axial movement to said rod, shaping means adapted to shape the pieces of butter or like material as they are extruded from said chamber by said plunger, means associated with said plunger and adapted to sever said shaped pieces into predetermined lengths, and a thrust bearing positioned between said sleeve and the associated end of the casing to take the rearward thrust of the plunger during the forward operative movement of the latter in the compression chamber.

14. An improved machine for shaping butter and like materials, consisting in the combination of a casing forming a compression chamber, a plunger adapted to operate within said chamber, a screw-threaded plunger rod attached to the plunger and extending through one end of said casing, a rotary sleeve extending through said end of the casing and surrounding the plunger rod, an operating handle directly carried by said sleeve, means carried by said sleeve for detachably threadedly coupling said sleeve to the threads of the rod whereby rotation of the sleeve will impart axial movement to said rod, shaping means adapted to shape the pieces of butter or like material as they are extruded from said chamber by said plunger, means associated with said plunger and adapted to sever said shaped pieces into predetermined lengths, a thrust bearing positioned between said sleeve and the associated end of the casing to take the rearward thrust of the plunger during the forward operative movement of the latter in the compression chamber, and a locking ring mounted on said sleeve and adapted to retain said bearing in position.

15. In a device of the character described, a reciprocating cutter frame, supporting lugs, guide bars extending through said lugs for reciprocably supporting said frame, means connecting one end of the frame to said guide bars, a yoke hinged to the other end of the frame, and means for detachably connecting the said yoke to the guide bars to permit removal of the latter from the lugs.

UMBERTO FABBRO.